(12) United States Patent
Murray

(10) Patent No.: US 6,427,144 B1
(45) Date of Patent: Jul. 30, 2002

(54) INFORMATION GATHERING FACILITY EMPLOYING DICTIONARY FILE CONTAINING INQUIRY INVOKING AN EXTERNAL PROCESS

(75) Inventor: Douglas George Murray, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/442,908

(22) Filed: Nov. 18, 1999

(51) Int. Cl.[7] .............................. G06F 1/10; G06F 7/00
(52) U.S. Cl. ......................................................... 707/3
(58) Field of Search .................... 707/1–10, 100–104.1, 707/200–205, 500.1, 511–512; 711/1, 210, 207

(56) References Cited

U.S. PATENT DOCUMENTS

| 5,005,122 A | 4/1991 | Griffin et al. ............... 364/200 |
| 5,553,282 A | 9/1996 | Parrish et al. .............. 395/600 |
| 5,619,716 A | 4/1997 | Nonaka et al. ............. 395/800 |
| 5,659,735 A | 8/1997 | Parrish et al. .............. 395/610 |
| 5,668,992 A | 9/1997 | Hammer et al. ............ 395/651 |
| 5,752,042 A | 5/1998 | Cole et al. .................. 395/712 |
| 5,752,245 A | 5/1998 | Parrish et al. ................. 707/10 |
| 5,835,911 A | 11/1998 | Nakagawa et al. ......... 707/203 |
| 5,884,302 A | * 3/1999 | Ho ................................. 704/2 |
| 5,909,689 A | 6/1999 | Van Ryzin ................... 707/203 |
| 5,915,112 A | 6/1999 | Boutcher ..................... 395/684 |
| 5,923,885 A | * 7/1999 | Johnson et al. ............. 345/738 |
| 6,016,497 A | * 1/2000 | Suver ........................ 707/101 |

OTHER PUBLICATIONS

IBM Technical Disclosure Bulletin, vol. 38, No. 08, Aug. 1995, "Version Equalizer Program for Server/Client", pp. 575–576.

* cited by examiner

*Primary Examiner*—John Breene
*Assistant Examiner*—Linh Pham
(74) *Attorney, Agent, or Firm*—John R. Pivnichny; Kevin P. Radigan, Esq.; Heslin Rothenberg Farley & Mesiti P.C.

(57) ABSTRACT

An information gathering facility is provided to gather information on a state of a computer system. The information gathering facility includes a dictionary file data structure having at least one inquiry which comprises at least one instruction to call a pre-existing executable on the computer system. The pre-existing executable is executed in response to processing of the at least one instruction and data is obtained from the executable. This data is used in accordance with the at least one instruction to derive a result to be included as part of the state information on the computer system.

34 Claims, 9 Drawing Sheets

POSSIBLE INQUIRY TYPES

- FILE
  - ✓ CHECK FOR EXISTENCE OF A FILE OF A CERTAIN DATE, TIME AND SIZE.
  - ✓ CAN RETURN FILE INFORMATION.

- INI FILE
  - ✓ CHECK FOR A CERTAIN APPLICATION, VARIABLE AND VALUE.
  - ✓ CAN RETURN A CERTAIN VALUE OR ALL VARIABLES AND VALUES.

- ASCII FILE
  - ✓ CHECK FOR A CERTAIN CHARACTER STRING IN A FILE.
  - ✓ CAN RETURN INFORMATION ON THE LINE WITH THE CHARACTER STRING.

- REGISTRY
  - ✓ CHECK FOR A CERTAIN REGISTRY TREE AND VALUE.
  - ✓ CAN RETURN VALUE OR ALL VALUES IN SUB TREES.

- EXTERNAL PROCESS USING INI OUTPUT
  - ✓ EXECUTE AN EXTERNAL PROCESS AND DO AN INI FILE INQUIRY ON THE RESULTS.

- EXTERNAL PROCESS USING ASCII OUTPUT
  - ✓ EXECUTE AN EXTERNAL PROCESS AND DO AN ASCII FILE INQUIRY ON THE RESULTS.

- EXTERNAL PROCESS USING REGISTRY
  - ✓ EXECUTE AN EXTERNAL PROCESS AND DO A REGISTRY INQUIRY ON THE RESULTS.

- MULTIPLE
  - ✓ DO A COMBINATION OF THE OTHER INQUIRES WHERE ALL MUST SUCCEED.

fig. 2

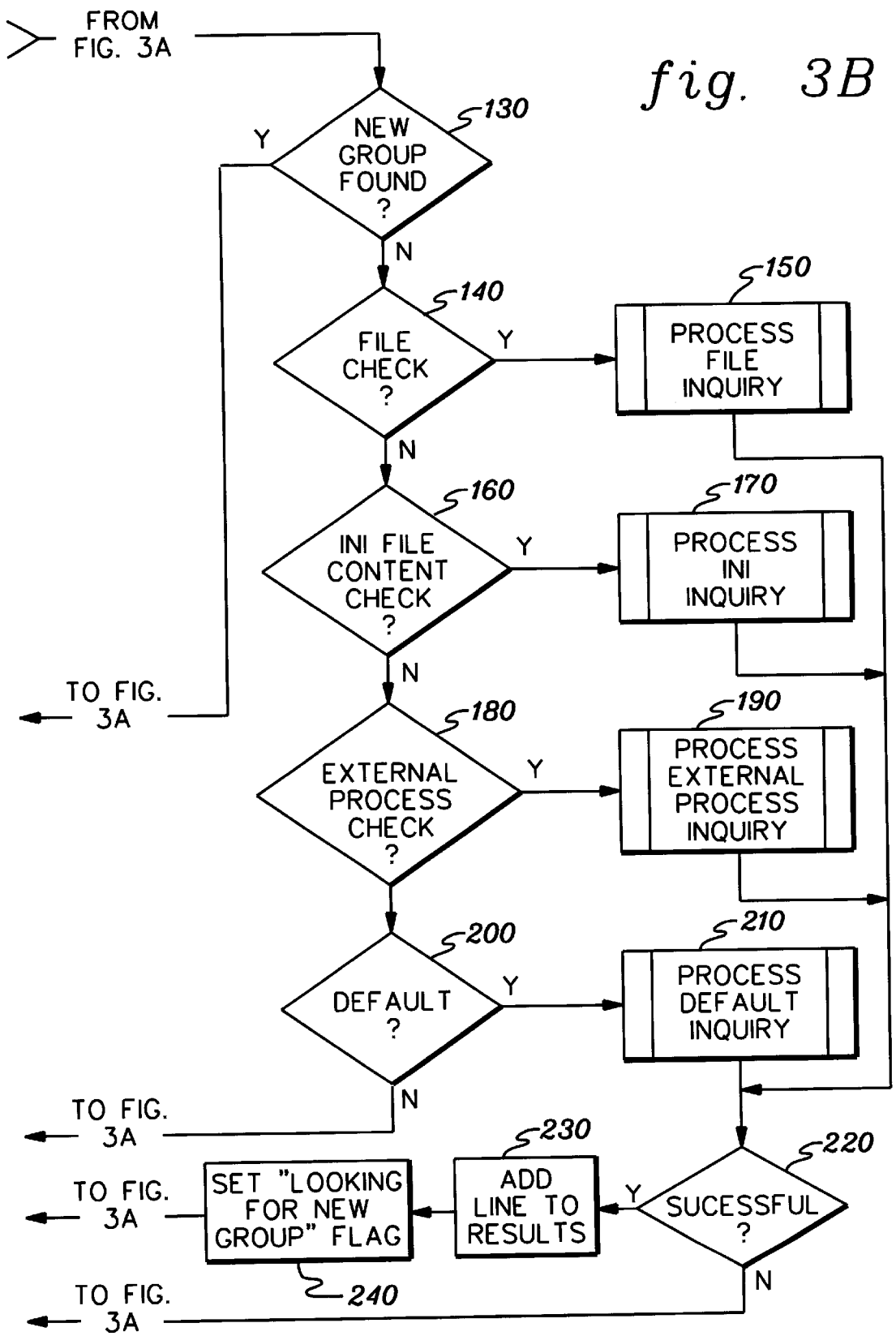

EXAMPLE DICTIONARY FILE

[IP ADDRESS]
;IPCONFIG;%APPID%=%VALUE%;IP ADDRESS;*
[HOSTNAME]
;IPCONFIG;%APPID%=%VALUE%;HOST NAME;*
[NAMESERVERS]
;IPCONFIG;%APPID%=%VALUE%;DNS SERVERS;*
[DHCP]
;IPCONFIG;DHCP IS ENABLED;DHCP ENABLED;YES
;IPCONFIG;DHCP IS NOT ENABLED;DHCP ENABLED;NO
[GATEWAY]
;IPCONFIG;%APPID%=%VALUE%;DEFAULT GATEWAY;*
[APPSW01]
;FILE;APPSW01=NOTES;4.6.1;NOTES.EXE;9/15/1997;19:15;232448
;FILE;APPSW01=NOTES;UNKNOWN %FIELD% %DATE% %TIME% %SIZE%;NOTES.EXE
[NOTESID]
;INI;NOTESID=%VALUE%;NOTES.INI;NOTES;LOCATION;*;NOTES.EXE fig. 8

INFORMATION GATHERING FACILITY EMPLOYING DICTIONARY FILE CONTAINING INQUIRY INVOKING AN EXTERNAL PROCESS

CROSS-REFERENCE TO RELATED APPLICATION

This application contains subject matter which is related to the subject matter of the following application, which is assigned to the same Assignee as this application and which is hereby incorporated herein by reference in its entirety:

"Information Gathering Facility Employing Dictionary File Containing Multiple Inquiries," by Douglas G. Murray, Ser. No. 09/442,909, co-filed herewith, Pending.

TECHNICAL FIELD

The present invention relates in general to information processing within a computer system, and more particularly, to an information gathering facility, for example, for a network of computer systems for use in ascertaining updated state information on one or more computer system within the network. Still more particularly, the invention relates to a configuration of a dictionary file data structure employed in ascertaining state information on one or more computer systems of a network and to a technique for gathering such information using the dictionary file.

BACKGROUND OF THE INVENTION

Computer networks provide a number of advantages over standalone systems. In a network, each computer is a node which communicates with other nodes over one or more links. Nodes may be provided which store and manage databases or other data files on mass storage devices, or which manage printers or links to public telecommunication networks, etc.

As networks become larger, and more computers, input/output devices and other machines are connected together, management of the network becomes more and more difficult. To alleviate data transfer limitations when connecting many nodes to a single network, networks are often divided into a smaller number of nodes, essentially creating separate networks which are then interconnected by means of bridges or gateways to allow a node on one sub-network to communicate with a node on another sub-network. This alleviates the data transfer limitations of networks, but does not alleviate management problems.

One problem associated with management of a computer system is managing software on the different computing nodes. Software management can include a number of functions, such as verifying that a computing node has a particular type of file, a particular version of the file, and possibly, ascertaining contents of the file. Keeping track of software distribution and use can be important for licensing purposes, as well as for basic functioning of the network. In the past, when computer systems were a single large, multiuser system, a system manager performed these functions. With the advent of single user systems, such as personal computers and workstations, the users have essentially become the system manager, requiring them to perform these system management tasks individually.

A need thus exists in the art for an enhanced, automated information gathering facility which allows state data, such as file existence and file configuration information, for one or more nodes to be maintained up-to-date in a control information repository of the computer system network.

DISCLOSURE OF THE INVENTION

Briefly summarized, the invention comprises in one aspect a method for gathering information on a state of a computer system. The method includes: providing a dictionary file having at least one inquiry for ascertaining state information on the computer system, the at least one inquiry comprising at least one instruction to call a preexisting executable on the computer system; executing the pre-existing executable in response to processing of the at least one instruction, and obtaining data therefrom; and using the data obtained from the pre-existing executable in accordance with the at least one instruction to derive a result to be included as part of the state information on the computer system.

Systems and program storage devices corresponding to the above-summarized method, as well as data structures encompassing the dictionary files employed thereby, are also described and claimed herein.

To restate, presented herein is an information gathering facility which can reside at a central location within a network of computer systems and be read from the central location by the individual computer systems when state information is to be derived. Thus, there is the ability to change one or more inquiries at the central location without making changes at all computer systems of the network. In accordance with the principles of the present invention, there is also an ability to design and implement inquiries of complicated machine configurations without programming, i.e., creating an executable of the file. Further, the format of the inquiry results, that is the state information returned, can be defined in the dictionary file itself, i.e., each instruction or line of inquiry in the dictionary file can possess a condition which if satisfied outputs a result and the cumulative results comprise the state information. This feature can be employed by other processes to query a machine and have the response formatted in a way that the process needs.

By providing multiple inquiries within a group, searching is possible for one or more of several versions of an application installed on a workstation in the network. When an inquiry finds the desired version on a workstation, the remaining inquiries are omitted. As new versions of an application become available, a new inquiry is simply added to the group that is looking for that application. This leaves intact all the inquiries that looked for the 'backlevel' versions. Code reuse is thus encouraged since other applications can use this tool to gather workstation information instead of including separate logic to do their inquiry.

As a further feature, existing utilities for executables on a computer system can be used by the dictionary file data structure to gather information about the system. This is accomplished through the use of at least one instruction which calls an existing executable with processing of the instruction. This allows the use of proven executables to collect information rather than recreating functions that may already be available for other reasons. This also provides a way of collecting the information that a utility gathers and sending it to a central processing server in a predefined condensed format. As noted above, the format is defined in the instruction itself contained within the dictionary file.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which:

FIG. 2 depicts an example of possible types of inquiry which could be employed in a directory file in accordance with the principles of the present invention;

FIGS. 3A & 3B are a flowchart of one embodiment for processing a directory file implemented in accordance with the principles of the present invention;

FIG. 8 is an example of a dictionary file data structure implemented in accordance with the principles of the present invention.

BEST MODE FOR CARRYING OUT THE INVENTION

Generally stated, provided herein is an information gathering facility which employs a dictionary file having an unique data structure. Specifically, the dictionary file has a plurality of inquiries for ascertaining state information on a computer system within a network of computers. The plurality of inquiries are organized into one or more subject groups. One or more of the subject groups contain multiple records or lines of inquiry. The information gathering technique employs this dictionary file by processing the inquiries of the subject groups to derive information on the state of the computer system. When multiple records or lines of inquiry exist within a given group, processing terminates with a first record of inquiry which has a condition that is satisfied by the computer system. One or more of the plurality of inquiries within the dictionary file are referred to herein as "instructions" and comprise inquiries with conditions that if satisfied cause the outputting of a result which is to be added to a file being constructed with the state information on the computer system. This feature allows programming (from the dictionary file) of the result to be output upon satisfaction of an inquiry contained within the dictionary file. Thus, the form of the information returned as the state information is dictated from the dictionary file itself. In one embodiment, the dictionary file comprises an ASCII file which is maintained at a central location within a computing network, and which is called by an inquiry tool (i.e., routine) resident on the computer system to be examined.

In another aspect, provided herein is an information gathering facility which employs a dictionary file having at least one instruction which comprises a unique data structure that calls a pre-existing executable on a computer system for which state information is to be gathered. Upon running the pre-existing executable and obtaining data therefrom, the instruction provides a result which is to be included as part of the state information, with the result being based on the data obtained from the executable. The result may comprise part of the data produced by the executable or information derived from the data in a format defined within the at least one instruction itself.

Figure 1:
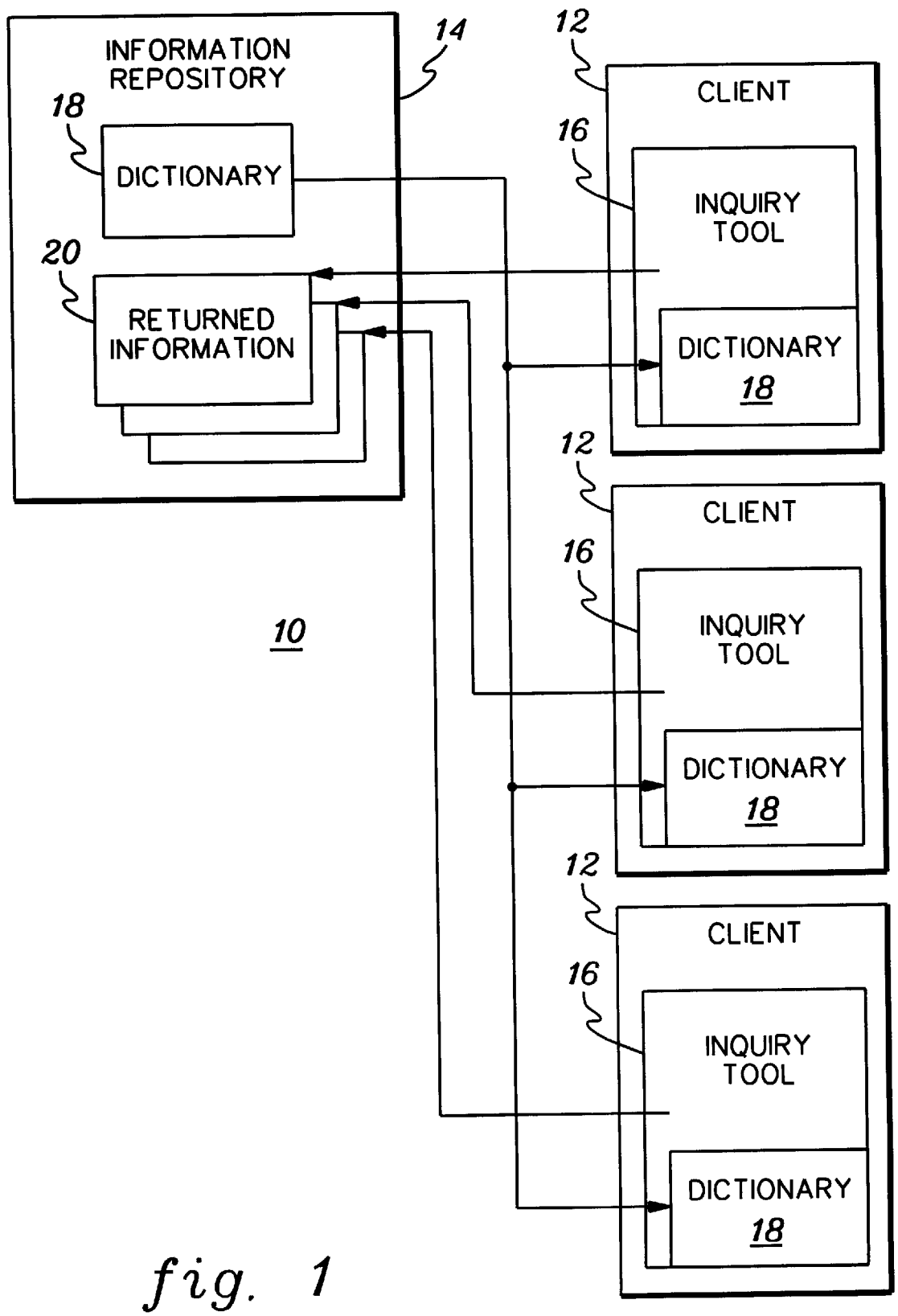
FIG. 1 depicts a computer system network implementing an information gathering facility in accordance with the principles of the present invention.

FIG. 1 depicts one embodiment of a computer network, generally denoted 10, which includes multiple computing systems such as client workstations 12 coupled to a server 14. As shown, server 14 functions as an information repository in accordance with the principles of the present invention. Each client workstation 12 includes an inquiry tool 16 and in this example a copy of the dictionary file 18 read from information repository 14. Inquiry tool 16 includes the control file which tells, for example, client 12 when to update its corresponding state information, where to go to obtain the dictionary file and where to return the state information 20. The inquiry tool is an application that is installed on a workstation that is used to gather information from the workstation. Once operational, the tool will gather the information when executed by the end user or optionally on a periodic schedule. Installation of this tool could be done at any time, but is typically done prior to a user receiving the workstation for use.

In this embodiment, the returned information 20 is stored at database 20 of information repository 14 of network 10. Preferably, the dictionary file copy at client 12 is updated each time inquiry tool 16 initiates processing to update the client state information. Note that as used herein the "state of the computer system" and "state information" refer to, for example, whether a program or file exists on the client, the version or level of the program or file, or to a variable or value from an application residing on the client or resulting from execution of an external process by the client as described in greater detail in the above-incorporated, co-filed application.

The information gathering facility of the present invention can be employed with many types of computer system environments and many types of computer systems. For instance, the computer environment might include an RS/6000 computer system running an AIX Operating System (RS/6000 and AIX are offered by International Business Machines Corporation). Alternatively, the computer environment could include a UNIX workstation running a UNIX-based operating system. Instead of a single system, the computing environment could comprise a network of computer systems such as depicted in FIG. 1 wherein each computer system could be a UNIX or AIX workstation and the units are coupled to one another via a TCP/IP connection. Each unit might include, for example, a central processing unit, memory and one or more input/output devices which are well-known in the art. Again, the information gathering facility of the present invention can be incorporated and used with any type of computing unit, computer, processor, node, system, workstation and/or environment without departing from the spirit of the present invention. As another example, each computer system might comprise a PS/2 computer offered by International Business Machines Corporation, or one or more of the units may be based upon the Enterprise Systems Architecture offered by International Business Machines Corporation. Additionally, connection between the computer systems need not be TCP/IP. It can be any type of wire connection, token ring or network connection, to name just a few examples.

FIG. 2 depicts one example of several possible inquiry types which can be employed by a dictionary file constructed in accordance with the principles of the present invention. These inquiry types include: a file inquiry with checks for existence of a file of a certain date, time and/or size, and which can return file information; an INI file inquiry which checks for a certain application, variable and/or value, and which can return a certain value or all variables and values; an ASCII file inquiry which checks for a certain character string in a file, and which can return information on a line within the character string; a registry inquiry which checks for a certain registry tree and value, and which can return a value or all values within a tree or subtree; an external process inquiry using an INI output which executes an external process and performs an INI file inquiry on the results; an external process inquiry using an ASCII output, which executes an external process and performs an ASCII file inquiry on the results; an external process inquiry using a registry which executes an external process and does a registry inquiry on the result; and a multiple inquiry which can comprise a combination of selected inquiry types wherein all inquiries must succeed.

By way of example, if application APP1 has an INI file entry of Version=1.0 for version 1.0 but for some reason the INI file is not used at all for version 2.0 but instead a new file APP1.DAT is used, the following would detect the installed version:

1. Check for APP1.DAT file on the system, if found version 2.0 is installed.
2. Check the INI file for Version=1.0 line, if found version 1.0 is installed.
3. Check for APP1.EXE to see if any version is installed.

As noted, one feature of an information gathering facility or Client Information Gathering Facility (CIGF) in accordance with the principles of the present invention is the dictionary file. This file is used to determine what the state of the computer system is and what information is to be returned to the server to be placed into the data repository. Within the dictionary file there are sections or groups of inquiries. Each group has one or more lines or records of inquiries that instruct CIGF how to gather the desired state information for that particular subject group. This information can be, for example, a version or setting data as supported by the options described below. Within the subject groups, any or all lines of inquiry may be used to obtain a result. In one example, a "Notes" grouping may have two lines which when processed determine the output, if any.

[Notes]
;file;Notes:V4.5;notes.exe;Mar. 11, 1997;231936
;file;Notes:Unknown %fileid% %date% %time% %size%;notes.exe
[next app]
;file;%appid%:V6;napp.exe;Jun. 22, 1996

First the file notes.exe is searched for in the file system. If it is found and is dated Mar. 11, 1997 and its size is 231936 then the string Notes:V4.5 is output. Otherwise, the process continues for each line under the group until one of the lines is successful or there are no more lines for the group. In this example, if the Notes.exe file could not be found according to the first line, then the second line is processed. Since there is no date, time or size specified for the second line then it will succeed if the Notes.exe file exists anywhere on the system. The output line will contain the full path where it was found and the date, time and size of the file.

There are several options that are available to be used on the lines for each group. The first character on the line can be used as the delimiter for each of the fields used when an option is used to return information.

The following is a description of certain possible options and the syntax of the lines that implement them. Each option below is available on various operating systems, such as the OS/2 Operating System offered by International Business Machines Corp.

Check for Existence of a File

This option can be used to check for the existence of a file to determine the version of software that is installed. The file option can be used to check for the existence of a set of files and return a version statement if the files are found.

Syntax:
;file;output;fileid1;date1;time1;size1; . . . ;fileidn;daten;timen;sizen Output
This is the output that will be placed in the output file if the files are found. There are several variables that will be substituted into this string before it is returned.
%appid%
The current group or application id.
%del%
The input field delimiter.
%fileid%
The full path of the last file being searched for.
%date%
The date of the last file being searched for.
%time%
The time of the last file being searched for.
%size%
The size of the last file being searched for.
Fileid1
The name and ext of a file to search for. This file is one that if it exists, the application is installed.
Date1
The date that the file must have in order to be this version.
* or no value means that the date of the file is not important.
Time1
The time that the file must have in order to be this version.
* or no value means that the time is not important.
Size1
The size that the file must have in order to be this version.
* or no value means that the size is not important.
Fileidn
Used if more than one file is to be checked.
Daten
Used if more than one file is to be checked.
Timen
Used if more than one file is to be checked.
Sizen
Used if more than one file is to be checked.

Obtain Data from Execution of External Application

IPConfig obtains TCP/IP information from the system by executing the WINIPCFG command on Windows 95 or the IPCONFIG command on Windows NT. Use the IPConfig option to run these utilities and extract information from the result to be sent to the repository. Note that this feature of the present invention is also described further below in connection with FIGS. 8 & 9.

Syntax:
;IPConfig;output;key;value

Outout
This is the output that will be placed in the output file if the key is found. There are several variables that will be substituted into this string before it is returned.

%appid%
   The current application id.
%del%
   The input field delimiter.
%key%
   The Key being searched for.
%value%
   The values found for all occurrences of the key within the app. When there are more than one value the delimiter is used between them.
Key
   This is an ASCII string of characters that are searched for at the beginning of each line output by the WINIPCFG or IPCONFIG commands. If found then the remainder of the line, following the: delimiter is used as the value associated with the key being searched for.
Value
   If a value is given then the inquiry will succeed only if the value given matches that on the line of the WINIPCFG or IPCONFIG output. When * is the value given or no value is given then the inquiry succeeds if the key is found in the WINIPCFG or IPCONFIG output and the value in that output is returned.

Obtain Data from an ASCII INI File

Often application INI files contain information that is required to determine how that application is installed. Use the INI option to extract information from an application INI file. Those skilled in the art will note that an INI file is an initialization file in Windows which provides persistent storage of configuration data. Many applications employ INI files to store information that must persist. Those skilled in the art of Windows programming understand the format and use of INI files.
   Syntax:
     ;ini;output;fileid;app;key;value;reg_exe
Output
   This is the output that will be placed in the output file if the key is found. There are several variables that will be substituted into this string before it is returned.
%appid%
   The current application (i.e., group) id.
%del%
   The input field delimiter.
%fileid%
   The full path of the INI file on the system.
%app%
   The application from the INI file.
%key%
   The key from the INI file.
%value%
   The values found for all accuracies of the key within the application are placed here. When there are more than one value the delimiter is used between them.
Fileid
   The name and extension of the INI file. A path may also be included but a drive letter is not supported.
App
   The application name within the INI file. This is required and is used to find the application in the file.
Key
   This is This is the key in the INI file. * or no value means that the "n" lines are to be read from the application and placed in the output as a delimited list.
Value
   If a value is given then the version is defined by this value assigned to the key. * or no value means that any value assigned to the key is all that is needed. When * is given as the key, then the number of lines to include in the output is given as the value. * or no value in this case means include all lines from the application.
Req_exe (Windows NT/2000/98/98 Versions)
   This is the name of the registered exe file that will use the INI file being searched. If reg_exe is given then the registered install directory for the executable is first searched for the INI file and then the PATH is searched. When a reg_exe is given the fileid cannot contain a path.

Output a Default String

Figure 3A:
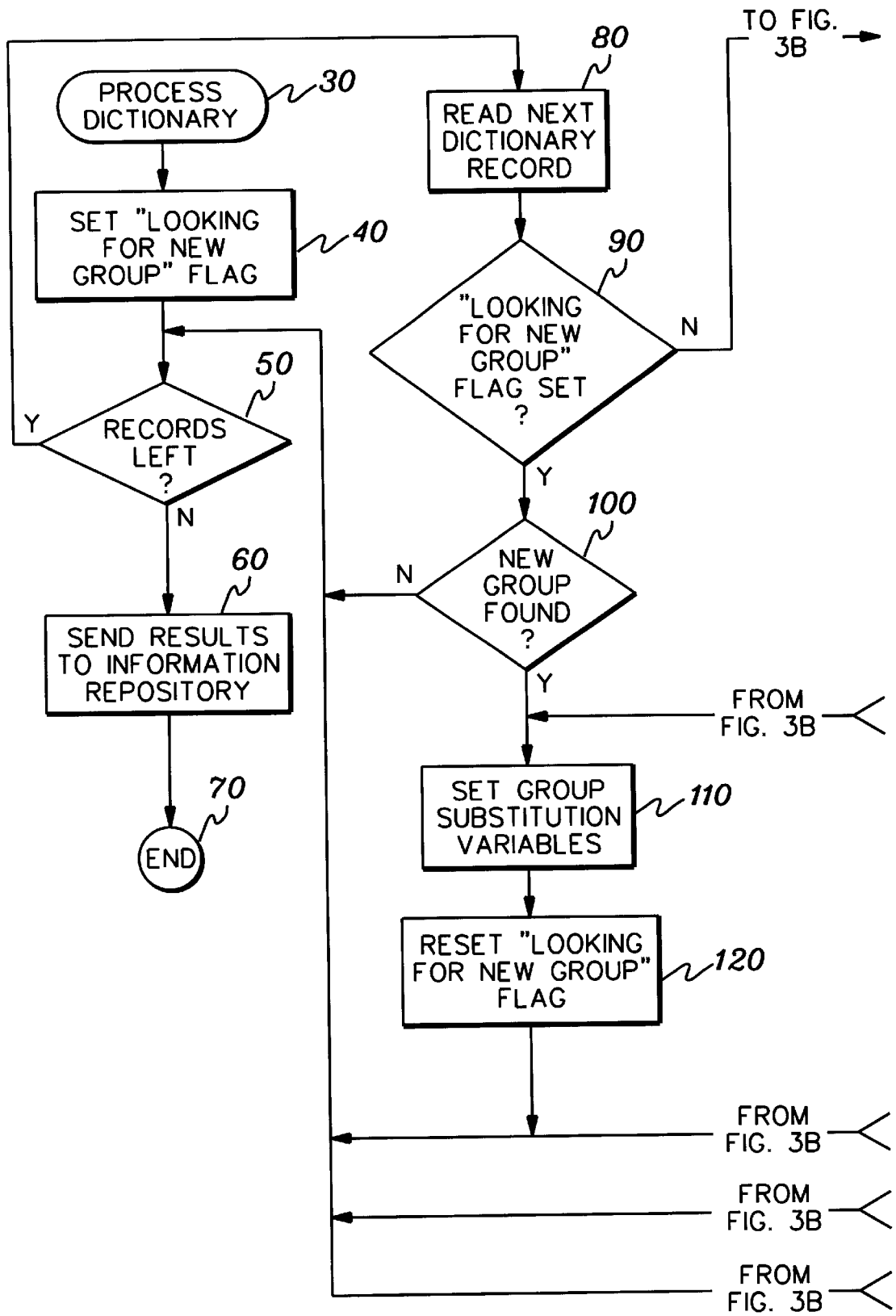

Default simply outputs text to the output file if none of the previous options were successful.
   Syntax:
     ;default;output
Output
   This is the output that will be placed in the output file. There are several variables that will be substituted into this string before it is returned.
%appid%
   The current application id.
%del%
   The input field delimiter.
   To summarize, there are several search options which could be employed to determine a version or other state information for a computer system, including:
   Searching for a file
   Searching for a certain INI file entry
   Using output of some other external application
   Checking for a default condition, or
   Looking for a registry key/value
   FIGS. 3A & 3B depict a flowchart of one embodiment for processing a dictionary file data structure in accordance with the principles of the present invention. The data structure in this example employs the first four options noted above. Other examples, however, will be apparent to those skilled in the art.
   In the embodiment of FIGS. 3A & 3B, dictionary file processing 30 begins with setting of a "Looking For a New Group" flag 40. As noted above, the dictionary file can be organized into multiple subject groups and the new group flag is set to indicate that the processing is searching for a next group in the file. Next, processing inquiries whether there are any records or lines in the dictionary file left to be processed 50. If "no", then the results obtained up to this point are output in a file to the information repository 60 and processing is terminated 70.
   Again, as used herein, a "record" is a line of inquiry which may comprise an "instruction" within the dictionary file. An instruction is a line of inquiry which contains a condition that when satisfied causes a result to be output for inclusion as a line in the file comprising the state information of the computer system under examination. In one example, each record or line of inquiry also comprises an instruction. If records remain, then processing reads a next record from the file 80 and determines whether the "Looking For New Group" flag is set 90. If so, then the new record may comprise the first line of the new group and inquiry determines whether the new group is found 100. If "no", then processing returns to determine whether any records remain in the dictionary file 50. If a new group has been found, then the group substitution variables for the new group are set 110. The group substitution variables could comprise values for the group which are to be inserted into the output with the state information. The "Looking For New Group" flag is then reset 120 and processing determines whether there are any records remaining 50. If so, then at the next pass through inquiry 90 the "Looking For New Group" flag will not be set and processing determines whether a new group is found 130. If a new group is found, this means that the previous group had no lines of inquiry and the group substitution variables are set for the new group 110.

Assuming that the record does not comprise a new group, then processing determines whether the record is a file check inquiry 140. If so, then a process file inquiry subroutine 150 is called. If the record is not a file check inquiry, processing determines whether the record is an INI file content check inquiry 160. If so, then a process INI inquiry subroutine 170 is called. If the answer to inquiry 160 is "no", then processing determines whether the record is an external process check inquiry 180, and if so, a process external process inquiry subroutine 190 is called. Finally, in this example, processing determines whether the record is a default inquiry 200. If so, the process default inquiry subroutine 210 is called. Otherwise, no action is taken and processing determines whether there are any records remaining 50.

FIGS. 4, 5, 6 & 7 respectively depict one embodiment of a process file inquiry subroutine 150, a process INI inquiry subroutine 170, a process external process inquiry subroutine 190, and a process default inquiry subroutine 210. Continuing with FIGS. 3A & 3B, after processing the record through the appropriate subroutine, inquiry is made whether the condition within the record has been satisfied 220. If so, then the result associated with the record is added to a results file to be output upon completion of dictionary file processing 230. The "Look For New Group" flag is then set 240 and processing looks for a next record in the dictionary file 50. If the condition in the record is unsuccessful, then processing directly returns to inquiry 50.

Figure 4:
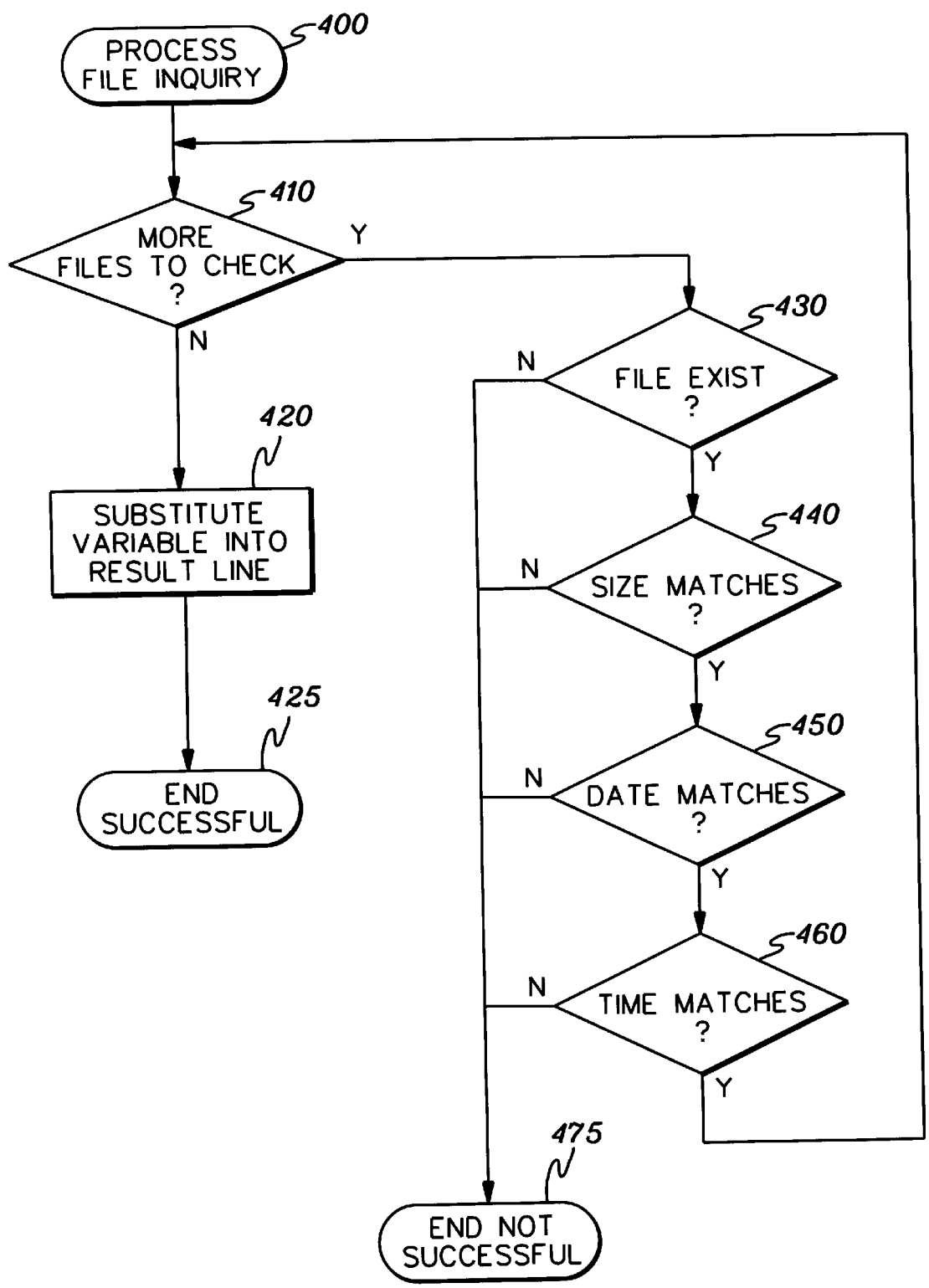
FIG. 4 is a flowchart of one embodiment of a process file inquiry routine called by the directory file process flowchart of FIGS. 3A & 3B.

FIG. 4 depicts one embodiment of a process file inquiry subroutine 400 which begins by checking whether there are more files in the inquiry to check 410. If "no", then the result or variables from the inquiry line are substituted into the result line to be output as the state information (from the processing of FIGS. 3A & 3B). The result line would also include the group substitution variables set during the processing of FIGS. 3A & 3B. This successfully ends processing 425 of the process file inquiry 400. If there are more files to be checked in the inquiry, processing determines whether the desired file exists 430, whether the size of the file matches the anticipated size 440, whether the date of the file matches 450 and whether the time of the file matches 460. If "yes" to these inquiries, then the condition has been satisfied and processing determines whether there are any more files to check. If "no", then the corresponding result of the inquiry is substituted into the result line to be output as the state information for the client and processing successfully terminates 425. If the answer to any of inquiry 430, 440, 450 or 460 is "no", then processing is terminated for the line of inquiry since the condition does not exist on the client 475.

Figure 5:
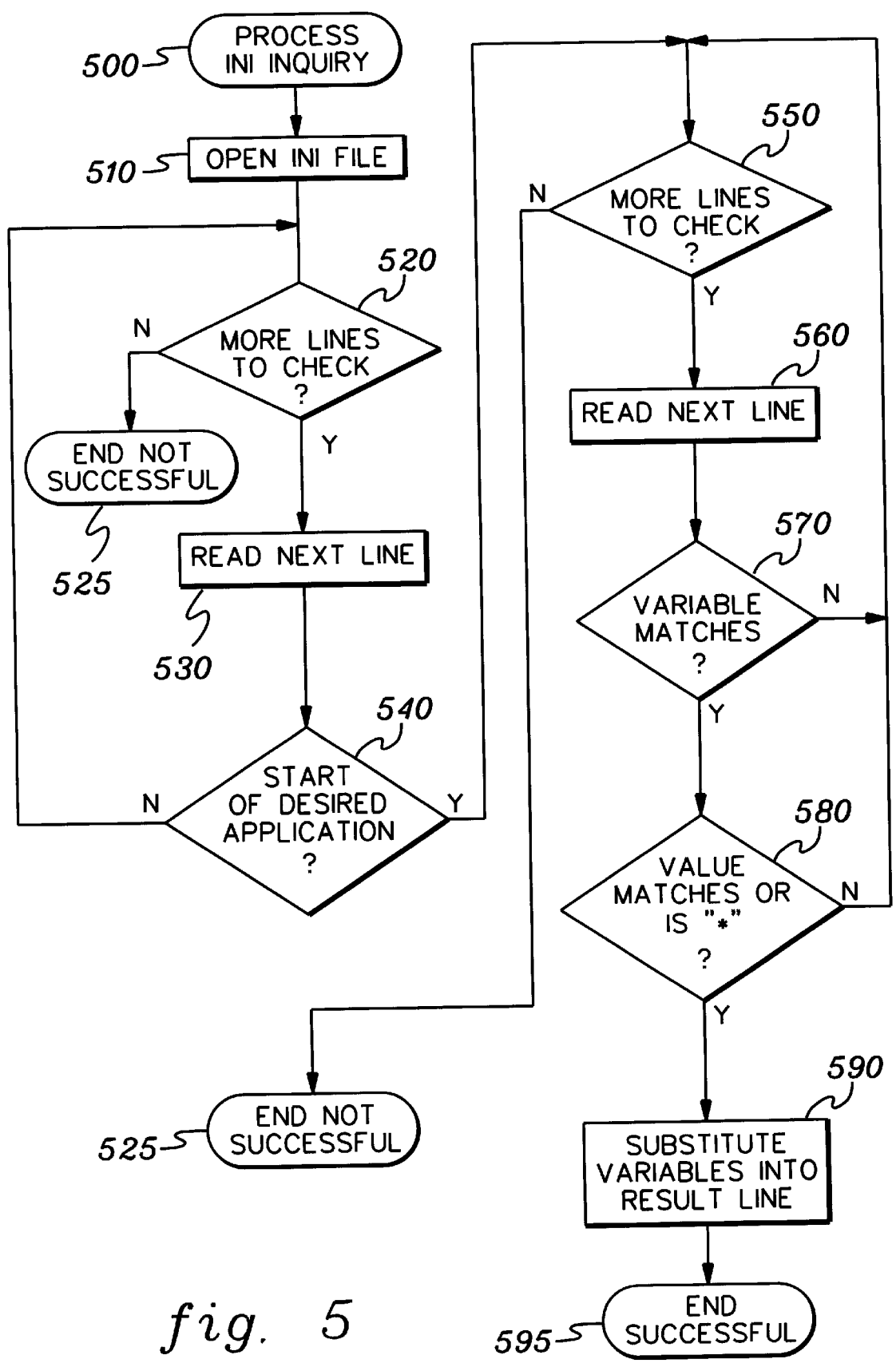
FIG. 5 is a flowchart of one embodiment of a process INI inquiry routine called by the directory file process flowchart of FIG. 3A & 3B.

FIG. 5 depicts one embodiment of a process INI inquiry routine 500 which begins by opening the INI file 510. Processing determines whether there are more lines to check in the INI file 520. If "no" then the process INI inquiry was not successful 525. Otherwise, the next line of the INI file is read 530 and processing determines whether the line is the start of a desired application or section in the INI file 540. If "no", then a next line in the INI file is checked and the process is repeated until the start of the desired application in the TNT file is found.

Once the start of the desired application is found, processing determines whether there are more lines in the INI file to check 550. If not, then the process INI inquiry has been unsuccessful 525. If so, the next line is read 560 and processing determines whether the variable matches 570. If "no", then a next line is checked 550. Otherwise, processing inquires whether the value of the variable matches or is a don't care 580. If "no", then a next line is checked. If the value matches or is a don't care, then the variables are substituted into the result line to be output as a portion of the state information 590 and the process INI inquiry is successfully ended 595.

Figures 6, 7:
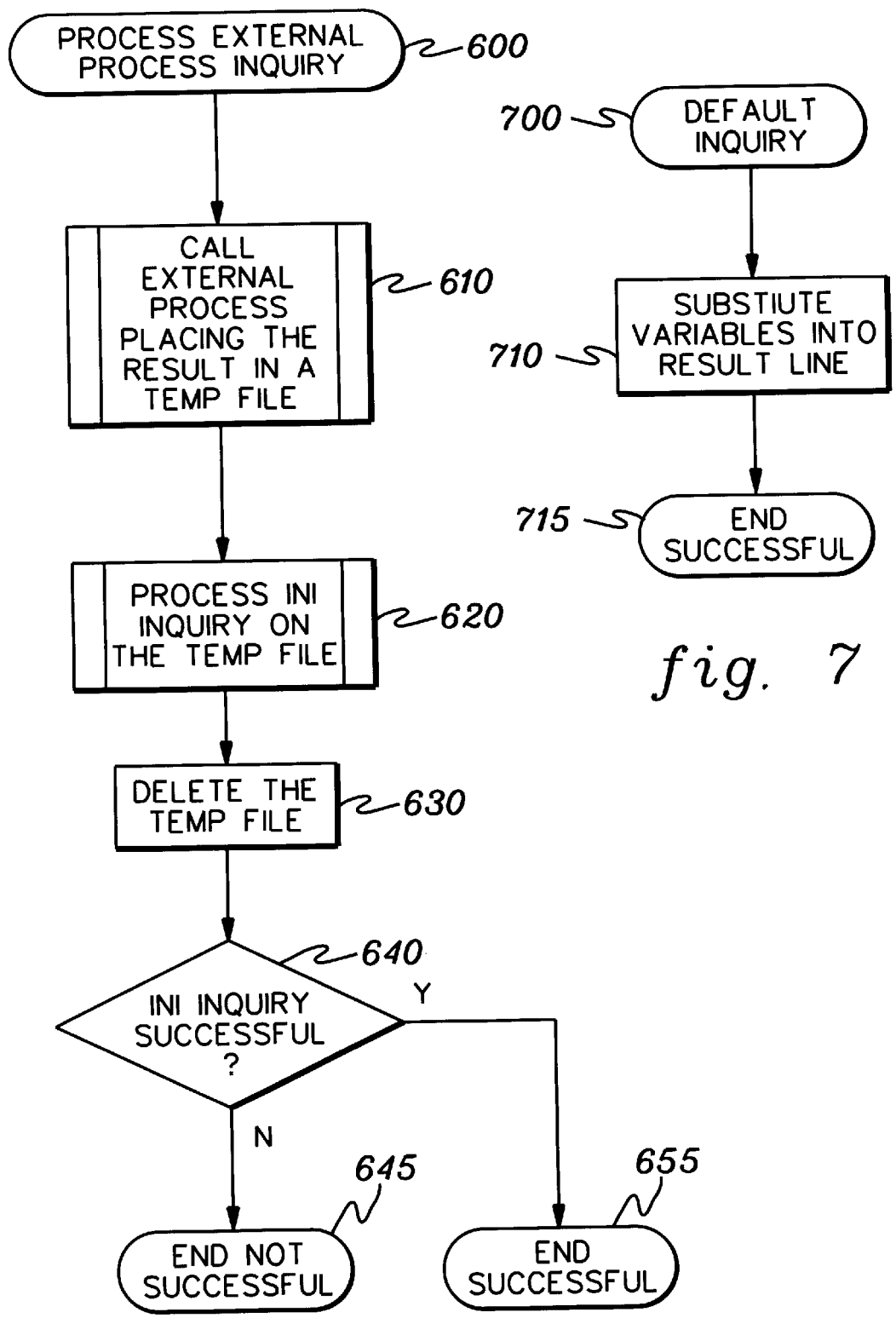
FIG. 6 is a flowchart of one embodiment of a process external process inquiry routine called by the dictionary file process of FIGS. 3A & 3B.
FIG. 7 is a flowchart of one embodiment of a default routine called by the directory process flowchart of FIGS. 3A & 3B.

FIG. 6 depicts one embodiment of a process external process inquiry 600 which calls the external process and places the result in a temporary file 610. As noted above, there are a number of options with respect to processing of an external application. The external application could output an INI file, an ASCII file, or registry changes. In this example, an INI file output is assumed. Thus, an INI inquiry is processed on the temporary file 620 to determine whether the condition has been successfully met. The temporary file is then deleted 630 and processing determines whether the INI inquiry was successful 640. If so, an end successful result 655 is obtained, otherwise an end not successful result is output 645.

FIG. 7 is a flowchart for processing a default inquiry 700. This processing simply comprises substituting variables into the result line 710 as defined by the default inquiry. Processing is always successful 715 with a default inquiry.

FIG. 8 depicts an example dictionary file wherein an external process IPConfig is called and the results of that external process are compared with a predefined condition. In this example, the fields are set off by a ";" delimiter. The first field of the first group (IP Address) is the type of inquiry, the second field describes how the result is to be formatted for that inquiry, the third field defines, in the case of the IPConfig inquiry, where in the output file of the IPConfig executable the desired data is to be found, and the fourth field is a don't care ("*") which translates into a request to return whatever value is found at that IP address in the output file of the executed IPConfig routine.

In the second group, referred to as HostName, the first field again indicates that this is an IPConfig call. The HostName is a name given in Windows which relates back to the actual address of the computer system at issue. The second field defines the result to be output. In this example, "APPID" refers to the group identifier (i.e., HostName), which equals a value obtained from the output file of the IPConfig executable. The third field, Host Name, again identifies a particular line on the output file of the IPConfig executable to be retrieved, and the "*" is a don't care meaning that the value found at that line is to be returned as the value to be inserted into the result for the inquiry. The third group in the dictionary file, i.e., NameServers, is similar to the second group in terms of the type of inquiry, formatting of the result and retrieval of information from the IPConfig executable output. The difference is that this group is looking for the "DNS Servers" information output by the IPConfig executable.

The fourth group in the dictionary file, labeled "DHCP", is inquiring as to a dynamic host CP address. This group again calls the executable IPConfig in the first field and defines the result to be output in the second field. In the first line of inquiry of the group the result is "DHCP is enabled", while in the second line the result is "DHCP is not enabled". Processing begins by executing the first inquiry and if satisfied, terminates the group thereby skipping the second inquiry. The third field in each inquiry identifies the address in the IPConfig executable output to be examined, in this case "DHCP Enabled". The first line of inquiry in group DHCP looks for a "yes" in the DHCP enabled line of the IPConfig executable output, while the second line of inquiry looks for a "no" in the DHCP enabled line. The corresponding result defined in the second field is the output dependent upon whichever condition is satisfied.

The fifth group, labeled "Gateway", again calls the IPConfig executable and defines the output as the application or group ID (herein Gateway) equal to a value which is to be retrieved from the default Gateway line of the IPConfig executable output. The "*" means that whatever data is at the default Gateway is to be returned as the value which is to be inserted into the result line as the variable value in the second field.

The sixth group in this dictionary file is labeled APPSW01. The first field specifies that this is a file inquiry, meaning that the group is looking for the existence of a particular file on the computer system. Thus, the dictionary file is shown to comprise both calls to pre-existing executables and other types of inquiries as explained above. The second field in each inquiry line under group APPSW01 defines the format of the result to be returned if the inquiry is successful. In the first line of inquiry, the result "APPSW01=Notes:4.6.1" is returned if the Notes.exe executable exists on the computer system, has a file date of Sep. 15, 1997, a time of recordation of 19:15, and has a size of 232448. Otherwise, the second line of inquiry outputs "APPSW01=Note:Unknown,field,date,time,size". The field, date, time and size variables are inserted from the information retrieved from the Notes.exe file. The last group is labeled "NotesID" and looks for an INI file. The line of inquiry outputs a result "NotesID="values"" where the value is substituted based upon the information retrieved. The third field identifies the particular file Notes.ini to be found and the Notes and location fields identify where the file is located. The "*" means that it does not matter what the value is at that location and the "Notes.exe" field identifies the name of the executable that uses this INI file, which is helpful in locating the INI file.

Those skilled in the art will note that FIG. 8 and the above description thereof are provided by way of example only and that there are numerous variations to the concepts presented. For purposes of this application, aspects to note include the calling of a pre-existing executable, for example, on the computer system for which state information is to be gathered, and the defining of the format of the result to be returned as the state information in the line of inquiry or instruction itself. Other features include the ability to insert data from the pre-existing executable into the result or not as desired.

Figure 9:
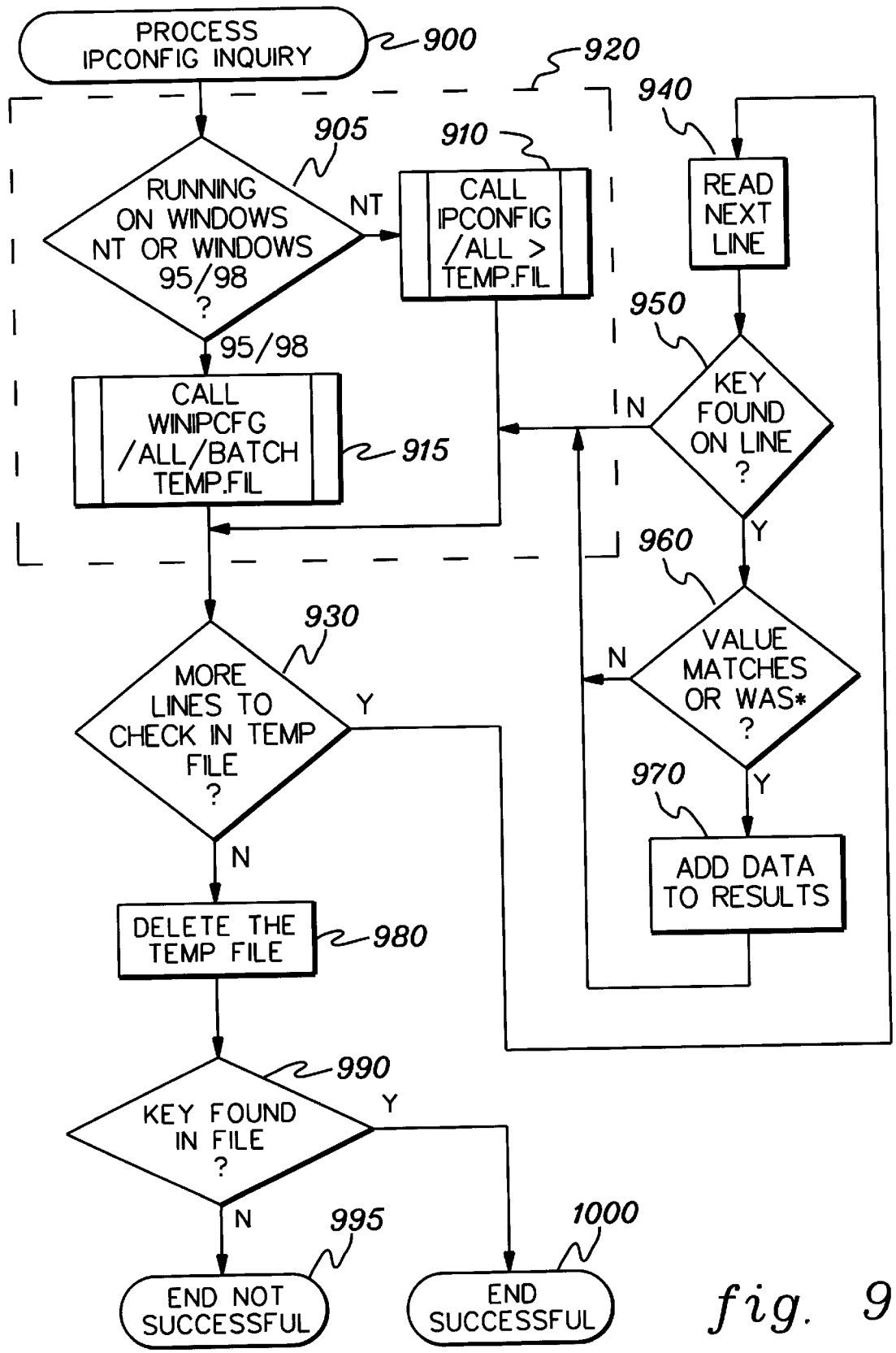
FIG. 9 is a flowchart of one embodiment of a process IPConfig executable called by a line of inquiry in a dictionary file implemented in accordance with the principles of the present invention.

FIG. 9 is one example of a flowchart for processing an IPConfig inquiry 900. Processing begins by determining whether the computer system is running Windows NT or Windows 95/98 905. If Windows NT, then a call is made to the IPConfig executable provided with Windows NT 910, otherwise a call is made to the WINIPCFG executable provided with Windows 95/98 915. Boxes 905, 910 & 915 are grouped together into a call specific process 920 which can be system platform dependent. Again, the IPConfig routine is one example of a pre-existing executable which could be employed in connection with the dictionary file and instructions of the present invention. Other existing Windows executables which could be called include: Net Use; ARP & Route Print. Further, the concepts presented herein are equally applicable to use with existing executables in non-Windows platforms as well.

Processing next determines whether there are more lines in the executable output contained in a temporary file to be checked 930. If "yes", the next line in the output file is read 940 and processing determines whether the key of interest is found on that line 950. If "no", return is made to inquiry 930 to obtain a next line in the output of the executable. If "yes", then processing determines whether the value on that line matches a value specified in the instruction contained in the dictionary file or the instruction in the dictionary file was a "*" (i.e., don't care) 960. If neither is correct, processing returns again to inquiry 930 to check for a next line in the executable output. If the value matches or was a don't care, then processing adds the data to the results 970 to be output, which again assumes that the line of inquiry in the dictionary file requests that the value be added as part of the result. Processing returns to inquiry 930 to check for a next line in the temporary file. If there are more than one match, they are put together in a string, for example, delimited by a ";". Once all lines in the executable output have been examined, processing deletes the temporary file 980 and again inquires whether the key has been found 990. If "no", then processing was not successful 995 and, alternatively, if the key was found, processing ends successfully 1000.

Those skilled in the art will note from the above description that presented herein is an information gathering facility which employs a dictionary file data structure at a central location to derive state information on one or more computer systems in a network. Advantageously, the format of the state information returned can be defined by results contained within the dictionary file data structure itself. The data structure comprises a plurality of inquiries which are organized into subject groups and when a particular condition of an inquiry is satisfied, all other inquiries in the group are skipped. As new versions of an application on one or more computer systems in the network become available, a new inquiry is simply added to the respective group that is looking for that application.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for gathering information on a state of a computer system, said method comprising:
   providing a dictionary file having at least one inquiry for ascertaining state information on said computer system, said at least one inquiry comprising at least one instruction to call a preexisting executable on said computer system;

executing said pre-existing executable in response to processing of said at least one instruction and obtaining data therefrom; and using said data obtained from said pre-existing executable in accordance with said at least one instruction to derive a result to be included as part of said state information on said computer system.

2. The method of claim 1, wherein said result is predefined in each of said at least one instruction and is output as part of said state information if a condition defined in said instruction is met by said data obtained from said pre-existing executable.

3. The method of claim 2, wherein said obtaining comprises placing said data obtained from said pre-existing executable in a temporary file for analysis in accordance with said instruction.

4. The method of claim 3, further comprising for each said instruction evaluating at least one line of data in said temporary file for a key identified in said instruction, and if found, determining whether a value of said key matches a value defined in said instruction, and if so, outputting said value in said result to be included as part of said state information on said computer system.

5. The method of claim 1, wherein said using comprises outputting as said result at least a portion of said data obtained from executing said pre-existing executable.

6. The method of claim 1, wherein said using comprises examining at least a portion of said data obtained from executing said pre-existing executable and based thereon, outputting said result in a format defined by said at least one instruction of said dictionary file.

7. The method of claim 1, wherein said at least one inquiry comprises a plurality of inquiries, and wherein at least some of said plurality of inquiries comprise instructions to call at least one pre-existing executable on the computer system, and wherein said method further comprises executing said at least one pre-existing executable during processing of said at least some instructions of said dictionary file.

8. The method of claim 7, wherein said computer system comprises one computer system of a plurality of computer systems coupled together across a network, and wherein said method further comprises creating a file of said state information on said computer system and transferring said file to an information repository coupled to said computer system via said network.

9. The method of claim 8, wherein said dictionary file comprises a rules database located at said information repository, and wherein said providing comprises retrieving said dictionary file from said information repository prior to processing of said at least one instruction.

10. The method of claim 1, wherein said executing of said pre-existing executable provides said data in at least one of an INI file, an ASCII file, or a registry file.

11. The method of claim 1, wherein said at least one instruction defines in a first field said pre-existing executable to be called, and in a second field how to format said result to be included as part of said state information on the computer system, output of which is dependent upon at least one inquiry specified in at least one additional field contained within said at least one instruction.

12. A memory for storing a dictionary file data structure, the dictionary file data structure facilitating gathering of information on a state of a computer system, the dictionary file data structure comprising:

at least one inquiry for ascertaining state information on said computer system, said at least one inquiry comprising at least one instruction to call a pre-existing executable on said computer system; and wherein executing of said pre-existing executable responsive to processing of said at least one instruction produces data, and wherein said at least one instruction provides a result to be included as part of said state information on said computer system using said data obtained from said executing of said preexisting executable.

13. A system for gathering information on a state of a computer system, said system comprising:

means for providing a dictionary file having at least one inquiry for ascertaining state information on said computer system, said at least one inquiry comprising at least one instruction to call a pre-existing executable on said computer system;

means for processing said at least one instruction to execute said pre-existing executable and for obtaining data therefrom; and means for using said data obtained from said pre-existing executable in accordance with said at least one instruction to derive a result to be included as part of said state information on said computer system.

14. The system of claim 13, wherein said result is predefined in each of said at least one instruction and is output as part of said state information if a condition defined in said instruction is met by said data obtained from said pre-existing executable.

15. The system of claim 14, wherein said means for obtaining comprises means for placing said data obtained from said pre-existing executable in a temporary file for analysis in accordance with said instruction.

16. The system of claim 15, further comprising for each said instruction means for evaluating at least one line of data in said temporary file for a key identified in said instruction, and if found, for determining whether a value of said key matches a value defined in said instruction, and if so, for outputting said value in said result to be included as part of said state information on said computer system.

17. The system of claim 13, wherein said means for using comprises means for outputting as said result at least a portion of said data obtained from executing said pre-existing executable.

18. The system of claim 13, wherein said means for using comprises means for examining at least a portion of said data obtained from executing said pre-existing executable and based thereon, for outputting said result in a format defined by said at least one instruction of said dictionary file.

19. The system of claim 13, wherein said at least one inquiry comprises a plurality of inquiries, and wherein at least some of said plurality of inquiries comprise instructions to call at least one pre-existing executable on the computer system, and wherein said system further comprises means for executing said at least one pre-existing executable during processing of said at least some instructions of said dictionary file.

20. The system of claim 19, wherein said computer system comprises one computer system of a plurality of computer systems coupled together across a network, and wherein said system further comprises means for creating a file of said state information on said computer system and for transferring said file to an information repository coupled to said computer system via said network.

21. The system of claim 20, wherein said dictionary file comprises a rules database located at said information repository, and wherein said means for providing comprises means for retrieving said dictionary file from said information repository prior to processing of said at least one instruction.

22. The system of claim 13, wherein said means for processing provides said data obtained from said pre-existing executable in at least one of an INI file, an ASCII file, or registry entry.

23. The system of claim 13, wherein said at least one instruction defines in a first field said pre-existing executable to be called, and in a second field how to format said result to be included as part of said state information on the computer system, output of which is dependent upon at least one inquiry specified in at least one additional field contained within said at least one instruction.

24. At least one program storage device readable by a machine, tangibly embodying at least one program of instructions executable by the machine to perform a method for gathering information on a state of a computer system, said method comprising:

providing a dictionary file having at least one inquiry for ascertaining state information on said computer system, said at least one inquiry comprising at least one instruction to call a pre-existing executable on said computer system;

executing said pre-existing executable in response to processing of said at least one instruction and obtaining data therefrom; and using said data obtained from said pre-existing executable in accordance with said at least one instruction to derive a result to be included as part of said state information on said computer system.

25. The at least one program storage device of claim 24, wherein said result is predefined in each of said at least one instruction and is output as part of said state information if a condition defined in said instruction is met by said data obtained from said pre-existing executable.

26. The at least one program storage device of claim 25, wherein said obtaining comprises placing said data obtained from said pre-existing executable in a temporary file for analysis in accordance with said instruction.

27. The at least one program storage device of claim 26, further comprising for each said instruction evaluating at least one line of data in said temporary file for a key identified in said instruction, and if found, determining whether a value of said key matches a value defined in said instruction, and if so, outputting said value in said result to be included as part of said state information on said computer system.

28. The at least one program storage device of claim 24, wherein said using comprises outputting as said result at least a portion of said data obtained from executing said pre-existing executable.

29. The at least one program storage device of claim 24, wherein said using comprises examining at least a portion of said data obtained from executing said pre-existing executable and based thereon, outputting said result in a format defined by said at least one instruction of said dictionary file.

30. The at least one program storage device of claim 24, wherein said at least one inquiry comprises a plurality of inquiries, and wherein at least some of said plurality of inquiries comprise instructions to call at least one pre-existing executable on the computer system, and wherein said method further comprises executing said at least one pre-existing executable during processing of said at least some instructions of said dictionary file.

31. The at least one program storage device of claim 30, wherein said computer system comprises one computer system of a plurality of computer systems coupled together across a network, and wherein said method further comprises creating a file of said state information on said computer system and transferring said file to an information repository coupled to said computer system via said network.

32. The at least one program storage device of claim 31, wherein said dictionary file comprises a rules database located at said information repository, and wherein said providing comprises retrieving said dictionary file from said information repository prior to processing of said at least one instruction.

33. The at least one program storage device of claim 24, wherein said executing of said pre-existing executable provides said data in at least one of an INI file, an ASCII file, or registry entry.

34. The at least one program storage device of claim 24, wherein said at least one instruction defines in a first field said pre-existing executable to be called, and in a second field how to format said result to be included as part of said state information on the computer system, output of which is dependent upon at least one inquiry specified in at least one additional field contained within said at least one instruction.

* * * * *